(12) United States Patent
Lim et al.

(10) Patent No.: US 9,032,021 B2
(45) Date of Patent: May 12, 2015

(54) METHOD FOR PROVIDING CUSTOMIZED ADVERTISEMENT/NEWS ON SCALABLE APPLICATION SERVICE SYSTEM

(75) Inventors: Tae-Beom Lim, Yongin-si (KR); Kyung-Won Kim, Seoul (KR); Jae-Won Moon, Seoul (KR); Seok-Pil Lee, Seongnam-si (KR)

(73) Assignee: Korea Electronics Technology Institute, Seongnam-si (KR)

(*) Notice: Subject to any disclaimer, the term of this patent is extended or adjusted under 35 U.S.C. 154(b) by 443 days.

(21) Appl. No.: 13/359,103

(22) Filed: Jan. 26, 2012

(65) Prior Publication Data
US 2013/0138724 A1 May 30, 2013

(30) Foreign Application Priority Data
Nov. 28, 2011 (KR) .................. 10-2011-0125379

(51) Int. Cl.
*G06F 15/16* (2006.01)
*G06Q 30/02* (2012.01)
*H04L 29/08* (2006.01)

(52) U.S. Cl.
CPC ........ *G06Q 30/0241* (2013.01); *H04L 67/2823* (2013.01); *H04L 67/303* (2013.01)
USPC ............ 709/203; 709/223; 709/230; 709/245

(58) Field of Classification Search
CPC .............. H04L 29/08072; H04L 29/06; H04L 29/0809
See application file for complete search history.

(56) References Cited

U.S. PATENT DOCUMENTS

| | | | |
|---|---|---|---|
| 2002/0062392 A1 | 5/2002 | Nishikawa et al. | |
| 2002/0062393 A1* | 5/2002 | Borger et al. | 709/246 |
| 2002/0099734 A1* | 7/2002 | Yassin et al. | 707/513 |
| 2005/0096980 A1* | 5/2005 | Koningstein | 705/14 |
| 2006/0282767 A1* | 12/2006 | Suryanarayana et al. | 715/513 |
| 2007/0055748 A1* | 3/2007 | Kim et al. | 709/219 |
| 2008/0059504 A1* | 3/2008 | Barbetta et al. | 707/102 |
| 2008/0120689 A1* | 5/2008 | Morris et al. | 726/1 |
| 2009/0260019 A1* | 10/2009 | Suryanarayana et al. | 719/315 |
| 2011/0161342 A1* | 6/2011 | Boskamp et al. | 707/769 |
| 2011/0161940 A1* | 6/2011 | Brunswig et al. | 717/139 |
| 2011/0161942 A1* | 6/2011 | Brunswig et al. | 717/143 |
| 2011/0295645 A1* | 12/2011 | Barros | 705/7.26 |
| 2012/0239663 A1* | 9/2012 | Tzruya et al. | 707/741 |

FOREIGN PATENT DOCUMENTS

CN 1539109 A 10/2004

OTHER PUBLICATIONS

Tae-Boom Lim, Kyung Won Kim, Yun Ju Lee, Jae Won Moon, Kyoungro Yoon, Scalable Application Framework to Support IPTV Client Device Independence Based on MPEG-21; 2011 IEEE International Conference on Consumer Electronics (ICCE); pp. 859-860.

* cited by examiner

*Primary Examiner* — Philip Chea
*Assistant Examiner* — Van Kim T Nguyen
(74) *Attorney, Agent, or Firm* — Sughrue Mion, PLLC

(57) ABSTRACT

There is provided a method of providing customized advertisement/news in a scalable application service system. The method of providing customized advertisement/news for a scalable application service server includes: substituting an advertisement/news component of existing content with a Scalable Application Description Language (SADL) component to create SADL integrated document; receiving an application request requesting transmission of the existing content, the application request including delivery context about a terminal; applying the delivery content about the terminal to parse the SADL integrated document, thereby creating customized content including customized advertisement/news; and transmitting an application response including the customized content to the terminal.

5 Claims, 8 Drawing Sheets

METHOD FOR PROVIDING CUSTOMIZED ADVERTISEMENT/NEWS ON SCALABLE APPLICATION SERVICE SYSTEM

CROSS-REFERENCE TO RELATED APPLICATION

This application claims the benefit under 35 U.S.C. §119 (a) of a Korean Patent Application No. 10-2011-0125379, filed on Nov. 28, 2011, the entire disclosure of which is incorporated herein by reference for all purposes.

BACKGROUND

1. Field

The following description relates to a scalable application service, and more particularly, to a method in which a scalable application service system provides scalable content including customized advertisement/news.

2. Description of the Related Art

With development of information communication technologies, more various kinds of electronic devices are being developed. Also, along with rapid development of mobile communication technologies, various kinds of mobile electronic devices as well as fixed-type electronic devices are being introduced. In the case of a desktop computer which is a representative fixed-type electronic device, the kinds of products are more and more diversified with performance enhancement. Meanwhile, typical analog electronic devices (for example, television) are being digitalized, and other home and office electronics (for example, washing machine, refrigerator, air conditioner, facsimile, printer, etc.) are also combined with information communication technologies to thus have enhanced performance while being further diversified.

Diversification in kind of electronic devices is significant in mobile devices. For example, a laptop computer, a cellular phone, a MP3 player, a digital camera, a hand-held multimedia player, a navigations, an electronic dictionary, an E-book reader, a DMB receiver, etc. have been already developed and widely being utilized. Also, recently, a smart phone, a smart pad, a tablet PC, etc. have been newly introduced, and related industries are rapidly being expanded. Accordingly, such mobile devices are more and more diversified according to their purposes and performance.

Besides, some functions of such fixed-type and/or mobile electronic devices are integrated. For example, a camera function, a GPS function, a multimedia reproducing function, etc. are presently adopted in most of electronic devices, and accordingly applications based on these functions are installed in the electronic devices when they are manufactured, or implemented to be able to be installed in them as necessary. Particularly, most of the electronic devices have a communication function using a wired/wireless network.

However, most of such electronic devices use different platforms and different service framework environments, as well as having different characteristics or performance according to their dedicated functions, and users who utilize the electronic devices also may have different ages, different sexes, different preferences, etc. Also, an electronic device may be used under different use environments according to users' tastes, network environments, etc. In the case of a service, such as a multimedia streaming service and a web service, which provides multimedia content, studies into providing a scalable service in consideration of the unique characteristics (for example, terminal capability, a display size, a supportable resolution, an accessible network, etc.) of various terminals have been conducted.

Recently, with popularization of an IPTV service using the Internet, broadcasting services move from a unidirectional service of providing multimedia content to viewers to an interactive service, and service objects are also being diversified. Along with the trend, the IPTV service is trying to provide applications executable in various terminals, as well as video, audio, images, and web content, and also is preparing to provide a mobile IPTV service using a mobile communication network. When a mobile IPTV service is realized, the IPTV service will be evaluated to an IP convergence service that can be supported in both wired and wireless networks. Particularly, since the mobile IPTV service will be able to be provided through all terminals having a communication function through a mobile communication network, the IPTV service is expected to be able to be supported for various terminals at the same time.

However, web contents, applications, advertisement, digital contents, Graphic User Interface (GUIs), etc. have been provided with a single format regardless of the kinds or characteristics of terminals so far, and standardization or studies into a method of providing application services optimized for various user viewing states (device capability, user information, a viewing state such as a network environment, a service policy, etc.) have not sufficiently been conducted. For example, an application program that reproduces multimedia content, data, etc. provided through an IPTV service has fixed characteristics (for example, image quality, sound quality, a security level, the kind or number of contents configuring GUI, an access range, etc.), and no adaptive service to which information about viewing states of individual users who use the IPTV service is reflected has been developed so far.

A method of providing an optimized application service in consideration of information about viewing states of users has been introduced in which a service provider creates a plurality of formats for content in consideration of various viewing states of users, stores the formats for content, and then searches for and provides, when receiving a request, content corresponding to the request. For example, when a user tries web browsing through a mobile device with a small size of display, a content provider, such as Naver, Daum, etc., enables the mobile terminal to access a web page created in advance for the mobile terminal in order to represent a web suitable for the mobile terminal. However, since the method should create various formats of content in advance and store them in a service server, a service provider had to cover high service cost. Also, creating content optimized for all terminals with various characteristics is practically impossible.

Meanwhile, some web services enable a user to select his or her preferred content to see it. For example, a service provider may provide a "my news" service to allow a user to view only articles from his or her preferred press on a main web page. However, in order to provide such a service, a service provider has to provide a user with all of content selectable by him or her, and also the user has to select his or her desired content in advance and store it. Furthermore, in the case where the stored content is deleted from the user's computer, the user should again select his or her preferred content and store it.

SUMMARY

The following description relates to a customized advertisement/news providing method capable of providing customized content without converting the format of existing content by reflecting information about a user's viewing state to a predetermined region related to advertisement/news of the existing content.

In one general aspect, there is provided a method of providing customized advertisement/news for a scalable application service server, including: substituting an advertisement/news component of existing content with a Scalable Application Description Language (SADL) component to create SADL integrated document; receiving an application request requesting transmission of the existing content, the application request including delivery context about a terminal; applying the delivery content about the terminal to parse the SADL integrated document, thereby creating customized content including customized advertisement/news; and transmitting an application response including the customized content to the terminal.

The delivery context about the terminal is included in Cookies and then anonymously received. The applying of the delivery context about the terminal includes applying delivery context collected by the scalable application service server together with the delivery context about the terminal received from the terminal.

In another general aspect, there is provided a method of providing customized advertisement/news in a scalable application service system, including: at the scalable application service server, creating Scalable Application Description Language (SADL) integrated document by substituting an advertisement/news component of existing content with a SADL component; at a terminal, transmitting an application request requesting transmission of the existing content to the scalable application service server; at the scalable application service server, transmitting the SADL integrated document to the terminal in response to the application request; and at the terminal, applying its own delivery context to the SADL integrated document to thereby create customized content including customized advertisement/news.

A part of the delivery context about the terminal is anonymously included in the application request, and the scalable application service server applies the delivery context about the terminal, which is anonymously received, to create partially parsed SADL integrated document and transmit the partially parsed SADL integrated document to the terminal. The delivery context about the terminal which the terminal applies to parse the SADL integrated document includes user information related to a user's privacy. The delivery context about the terminal further includes viewing state information about the terminal, which changes in real time.

Other features and aspects will be apparent from the following detailed description, the drawings, and the claims.

Figure 1:
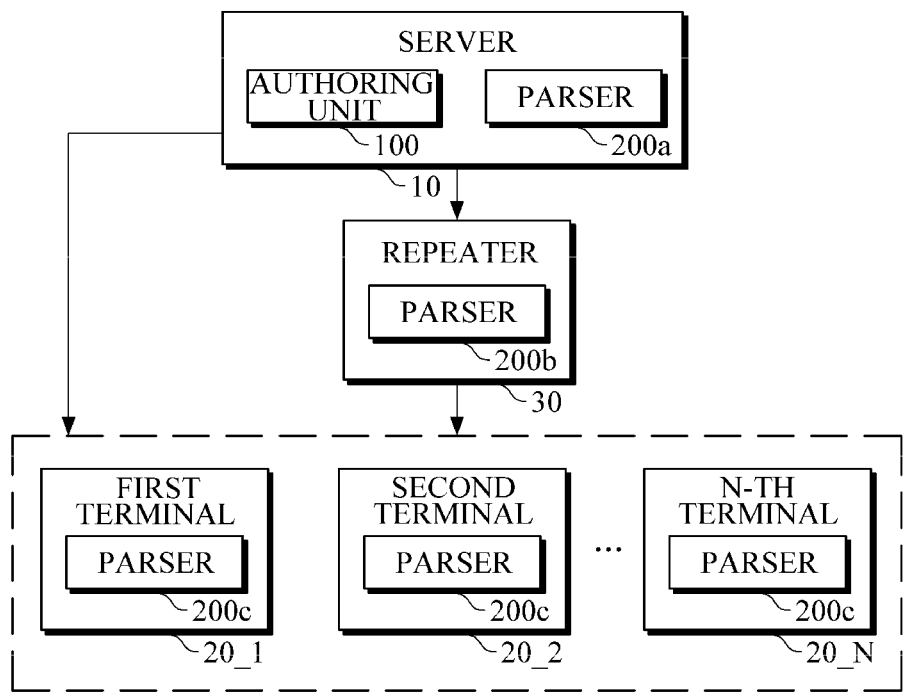
FIG. 1 is a diagram illustrating a configuration example of a network system that can provide an application service.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Prior to describing a customized advertisement/news providing method, an example of a network system that can provide a scalable application service will be described below. FIG. 1 is a diagram illustrating a configuration example of such a network system. Referring to FIG. 1, the network system includes a server 10 and a plurality of terminals 20_1 through 20_N. Also, the network system may further include a repeater 30 that relays communications between the server 10 and the terminals 20_1 through 20_N. Also, the server 10 includes an authoring unit 100, and at least one of the server 10 and the terminals 20_1 through 20_N may include parsers 200a, 200b, and 200c.

Each terminal 20_1 through 20_N may be one of various digital devices that can configure a home network system or that can allow users to use various services therethrough. However, the network system is not limited to a home network system and may be any other network system that can be configured using a predetermined communication network (a wired network, a wireless network, a mobile communication network, a short range communication network, a mobile network, etc.). Also, each terminal 20_1 through 20_N may be a mobile device, such as a smart phone, a Personal Digital Assistant (PDA), a cellular phone, a Personal Communication Service (PCS) phone, a hand-held PC, a Global System for Mobile (GSM) phone, a Wideband Code Division Multiple Access (WCDMA) phone, a CDMA200 phone, a Mobile Broadband System (MBS) phone, etc. Also, each terminal 20_1 through 20_N may be a Personal Computer (PC), a tablet PC, a laptop computer, a digital TV, etc.

The terminals 20_1 through 20_N are connected to the server 10 in a wired or wireless network for communication with the server 10. Here, the terminals 20_1 through 20_N may be connected to the server 10 directly or via the repeater 30 of the corresponding network system. If the terminals 20_1 through 20_N are connected directly to the server 10, the terminals 20_1 through 20_N communicate directly with the server 10, however, if the terminals 20_1 through 20_N are connected to the server 10 via the repeater 30, the terminals 20_1 through 20_N communicate with the server 10 through the repeater 30. Also, the repeater 30 may relay all of the terminals 20_1 through 20_N or there may be provided a plurality of repeaters to distributively relay the terminals 20_1 through 20_N.

The server 10 may be a service server that can provide a scalable application service for providing optimized content to one or more terminals 20_1 through 20_N that have requested the service. In order to provide optimized content to each of the terminals 20_1 through 20_N having different user viewing states, the server 10 may use delivery context (DC) which represents user viewing states of the terminals 20_1 through 20_N and is received directly from the terminals 20_1 through 20_N requesting a service or through the repeater 30. Or, the server 10 may use both the received DC and pre-stored DC about the terminals 20_1 through 20_N. Also, according to an example, all or a part (for example, DC related to privacy) of DC about the terminals 20_1 through 20_N may not be transferred to the server 10. It is also possible that all or a part of DC is anonymously transmitted to the server 10 in response to a request from a service policy or the server 10 so that no user' ID is exposed to the outside.

The server 10 creates Scalable Application Description Language (SADL) content by substituting a part of existing content or legacy content, such as multimedia content, an application, web pages, advertisement, a graphic user interface (GUI), etc., being serviced, with a SADL component so that optimized content can be provided to each of the terminals 20_1 through 20_N. The SADL content may be described as SADL integrated document, and the SADL integrated document is created by substituting a component of existing content document with a SADL component. Accordingly, the SADL integrated document has the same format as the existing content document. For authoring the SADL integrated document, the server 100 may include an authoring tool 100. SADL integrated document or SADL integrated content that is produced by the authoring tool 100 is stored in a storage of the server 10 or in a separate storage server. The operation of the authoring tool 100 will be described in detail later.

Meanwhile, the server 10 may parse the SADL integrated document using the parser 200a to provide customized content including optimized, customized advertisement/news to one or more terminals 20_1 through 20_N that have requested an application. Or, the server 10 may provide SASL integrated document including a SADL component that is converted into customized advertisement/news when being parsed with the parsers 200b and 200c of the repeater 20 or the terminals 20_1 through 20_N. In order to provide SADL integrated document including customized content or a SADL component to the terminals 20_1 through 20_N, the server 10 may receive DC about the terminals 20_1 through 20_N, directly from the terminals 20_1 through 20_N, using the parser 200a, or through the repeater 30, and then apply the DC to the SADL integrated document. Alternatively, the server 10 may apply both DC received using the parser 200a and pre-stored DC about the terminals 20_1 through 20_N to SADL document to thereby create SADL integrated document including customized content or less SADL components.

Referring again to FIG. 1, the repeater 30 relays communication between the terminals 20_1 through 20_N and the server 10. At this time, the repeater 30 may perform predetermined processing on received data before relaying communication between the terminals 20_1 through 20_N and the server 10.

For example, the repeater 30 may remove a part of DC included in a service request received from the terminals 20_1 through 20_N and transfer the resultant service request to the server 10. Also, the repeater 30 may include DC stored therein in a service request received from the terminals 20_1 through 20_N and transfer the resultant service request to the server 10. Furthermore, the repeater 30 may transfer content or SADL integrated document received from the server 10 to the terminals 20_1 through 20_N without any addition or conversion, or the repeater 30 may apply DC about the terminals 20_1 through 20_N stored therein to SADL integrated document received from the server 10 to thereby transfer more optimized content or SADL integrated document to each of the terminals 20_1 through 20_N. Meanwhile, communication between the terminals 20_1 through 20_N and the server 10 may be performed through a single repeater 30 or through two or more repeaters 30.

According to the configuration of the network system, the terminals 20_1 through 20_N may receive customized content including advertisement/news optimized for them from the server 10 or the repeater 30. In this case, the terminals 20_1 through 20_N may reproduce the received content as it is. However, according to an example, all or a part of the terminals 20_1 through 20_N may apply their own DC to SADL integrated document received from the server 10 or the repeater 30 to create advertisement/news optimized for them and include the optimized advertisement/news in the SADL integrated document, and then reproduce the resultant SADL integrated document. For example, the terminals 20_1 through 20_N may transfer no DC part related to privacy among their own DC to the server 10, and apply the remaining DC to received SADL integrated document.

Figure 2:
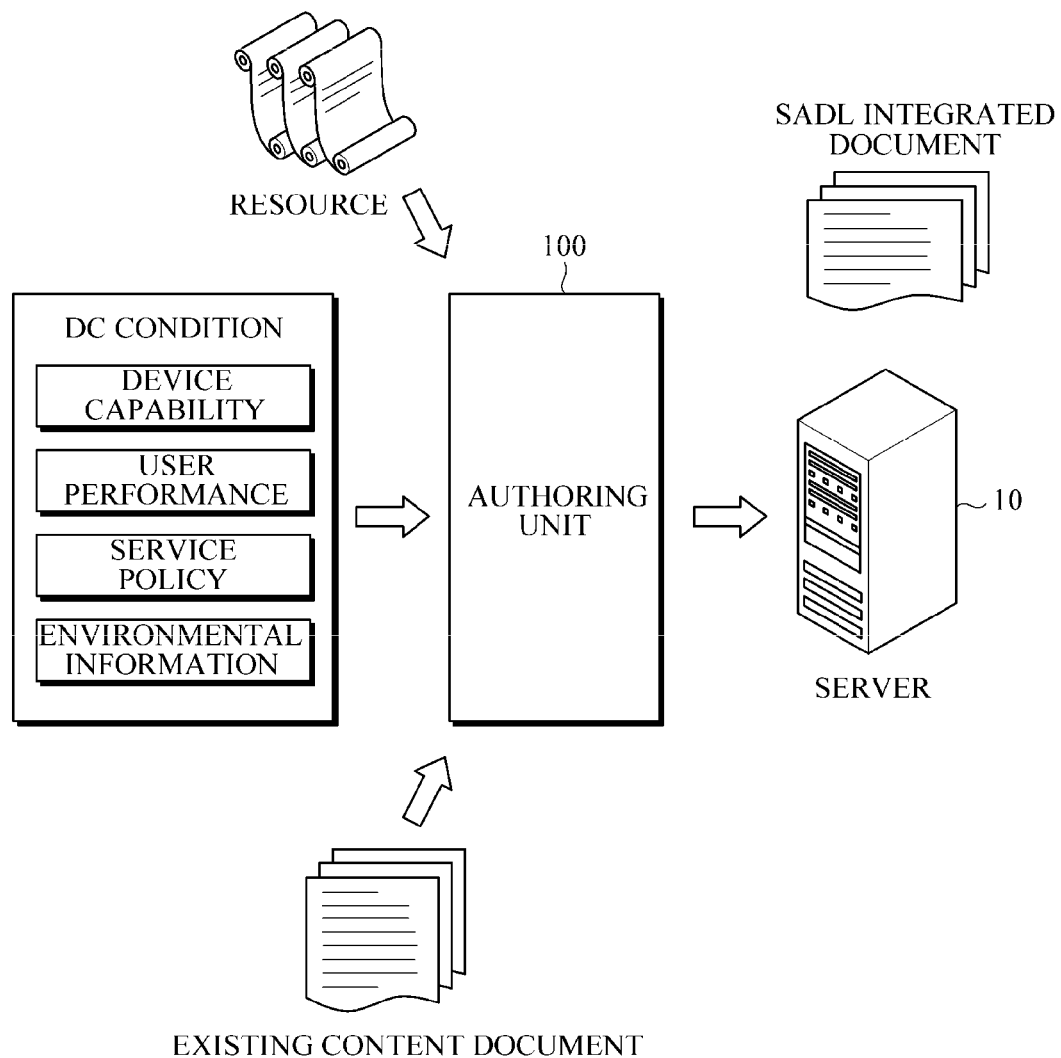
FIG. 2 is a view for explaining an example of an operation of an authoring unit for providing a customized advertisement/news service in a scalable application service system.

FIG. 2 is a view for explaining an example of an operation of the authoring unit 100 for providing a customized advertisement/news service in a scalable application service system. In the example of FIG. 2, the authoring unit 100 is shown as an independent unit that can be separated from the server 10, but, this is only exemplary. That is, the authoring unit 100 may be a module included in the server 10 (see FIG. 1) or in another apparatus that is separated from the server 10. Also, in the example of FIG. 2, SADL integrated document is stored in the server 10, however, this is also exemplary. That is, SADL integrated document may be stored in a separate database (a storage server).

Referring to FIG. 2, the authoring unit 100 functions as a tool for producing SADL integrated document to enable a resource corresponding to DC about a specific terminal to be included in a part (for example, news or advertisement) of existing web content. In more detail, the authoring unit 100 receives a predetermined format of content document (for example, JAVA script, FRASH document, XHTML document) describing existing content, DC conditions, and content (that is, a resource) that is to be provided to a specific user in correspondence to values of the DC conditions and then process them to thereby create SADL integrated document.

DC of the DC conditions among the data input to the authoring unit 100 may be one or more among device capability information about the capability of a user terminal, user information about the user's age, preferences, occupation, sex, native place, etc., a service policy about a policy of a service provider who provides a scalable application service, and viewing state information about a network environment, the terminal's current state (the remaining amount of battery power, the terminal's current location, etc.), and so on. Also, the "content corresponding to the values of the DC conditions" indicates content (a resource) that is provided differentiatively according to the values of the DC conditions, and the "existing content document" may be document (for example, existing webpage description document that cannot service any scalable service) that describes existing content. Also, the SADL integrated document created by the authoring unit 100 may be document resulting from substituting a component related to advertisement/news included in existing content document (for example, XHTML document) with a SADL component described in SADL.

The SADL may be one of markup languages developed for providing scalable application services or may be a new markup language that will be developed in the future. The SADL is a language that is described to share application programs (contents) between various digital devices based on the MPEG-21 Digital Item Declaration (DID) element structure. The SADL integrated document may be created using an authoring tool according to an example, according to a pre-defined schema. The pre-defined schema may be a DC condition schema that can exist at the same location as a statement element, among an existing MPEG-21 DID schema and a DID element. That is, the SADL is a markup language that can provide a scalable application service by newly defining and using a DC condition which is a new element capable of using a stack function based on the MPEG-21 DID element structure.

According to an example, the authoring unit 100 as illustrated in FIG. 2 is used to substitute a component described in existing content document (for example, XHTML document) with a SADL component described in SADL to thereby provide scalability to a part (for example, an advertisement/news region in a webpage of a portal site) of existing content. For example, the server 10 may use SADL integrated document including a SADL component, created by the authoring unit 100, to service content that displays differentiated advertisement according to a user's age, sex, and preferences and/or according to a service policy (for example, according to whether the user is a free-of-charge user or a charged user). Also, the server 10 may use SADL integrated document including a SADL component, created by the authoring unit 100, to service content that displays differentiated news/information according to a user's age, sex, a user's favorites, a user's location, a current time, a current weather condition, etc. In addition, the server 10 may use SADL integrated document including a SADL component, created by the authoring unit 100, to service content having a different resolution or a different screen size according to a network state, the type of a sensor included in a user terminal, whether or not a multimedia codec is supported, the kind of a supported codec, whether or not I/O is supported, etc.

Figure 3:
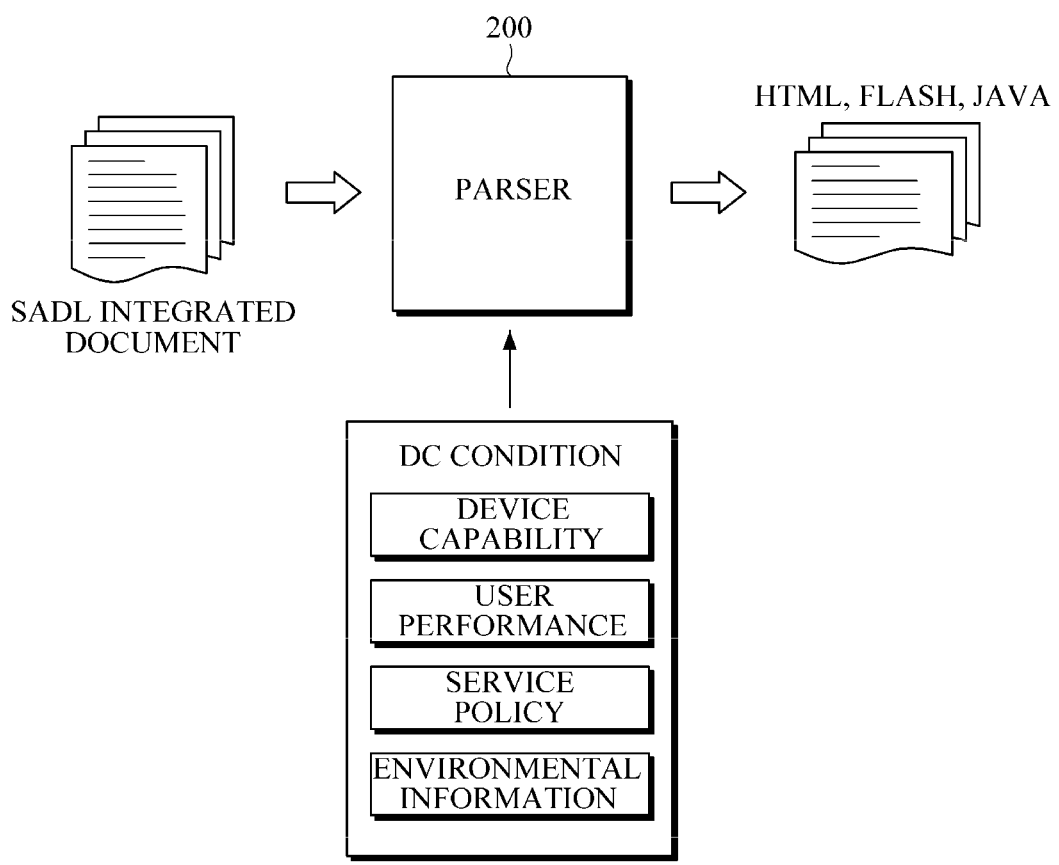
FIG. 3 is a view for explaining an example of an operation of a parser for providing a customized advertisement/news service in a scalable application service system.

FIG. 3 is a view for explaining an example of an operation of a parser for providing a customized advertisement/news service in a scalable application service system. As described above with reference to FIG. 1, a parser 200 may be installed in at least one of the server 10, the repeater 30, and the terminals 20_1 through 20_N of the network system illustrated in FIG. 1. If the parser 200 is installed in two or more of the server 10, the repeater 30, and the terminals 20_1 through 20_N, DC may be all applied to one (for example, the server 10) of the server 10, the repeater 30, and the terminals 20_1 through 20_N. Alternatively, a part of DC may be applied to one (for example, the server 10) of the server 10, the repeater 30, and the terminals 20_1 through 20_N and the remaining part of the DC may be applied to another one (for example, the repeater 30 and/or the terminals 20_1 through 20_N).

Hereinafter, it is assumed the case where all of DC is applied to SADL integrated content in a single parser 200 (for example, a parser of the server 10) to create customized content optimized for the corresponding terminal. However, the operation of the parser 200 that will be described below can be also applied in the same way to the case where two or more parsers are used. When two or more parsers are used, the remaining parsers except for a final parser apply a part of DC to SADL integrated content to create intermediate SADL integrated content.

Referring to FIG. 3, the parser 200 functions as a tool for creating content including advertisement/news content optimized for each terminal, that is, customized advertisement/news, from SADL integrated document (document describing SADL integrated content). In more detail, the parser 200 calls DC about a specific terminal to apply the DC to SADL integrated document, thereby creating customized content for the terminal. Then, the parser 200 converts the customized content into a format presentationable by a legacy device, such as a HTML browser, a FLASH player, a JAVA virtual machine, etc.

SADL integrated document that describes an original SADL application (or SADL integrated content) is input in the form of a file or URL to the parser 200. The parser 200 parses the received SADL integrated document in a designated data format and then filters valid resources. Valid selection IDs are selected depending on a DC condition value that is received in real time. DC has been defined in advance, and a DC condition function of the parser 200 calls the DC condition value to receive it in real time. A stack function of the parser 200 controls the DC condition function to analyze a received DC condition value with respect to content described in the SADL integrated document, thereby determining a current situation. According to the result of the determination, valid selection IDs are decided and stored in database (DB). Then, the parser 200 combines optimum application program resources based on the valid selection IDs. That is, the parser 200 combines a resource (customized advertisement/news) selected according to the DC condition value with resources of other components included in the SADL integrated document except for a SADL component. Then, the combined resources (that is, customized content) are formatted such that they can be rendered without any limitation even in a terminal including a legacy device, thereby creating an optimized application program (a final application).

Figure 4:
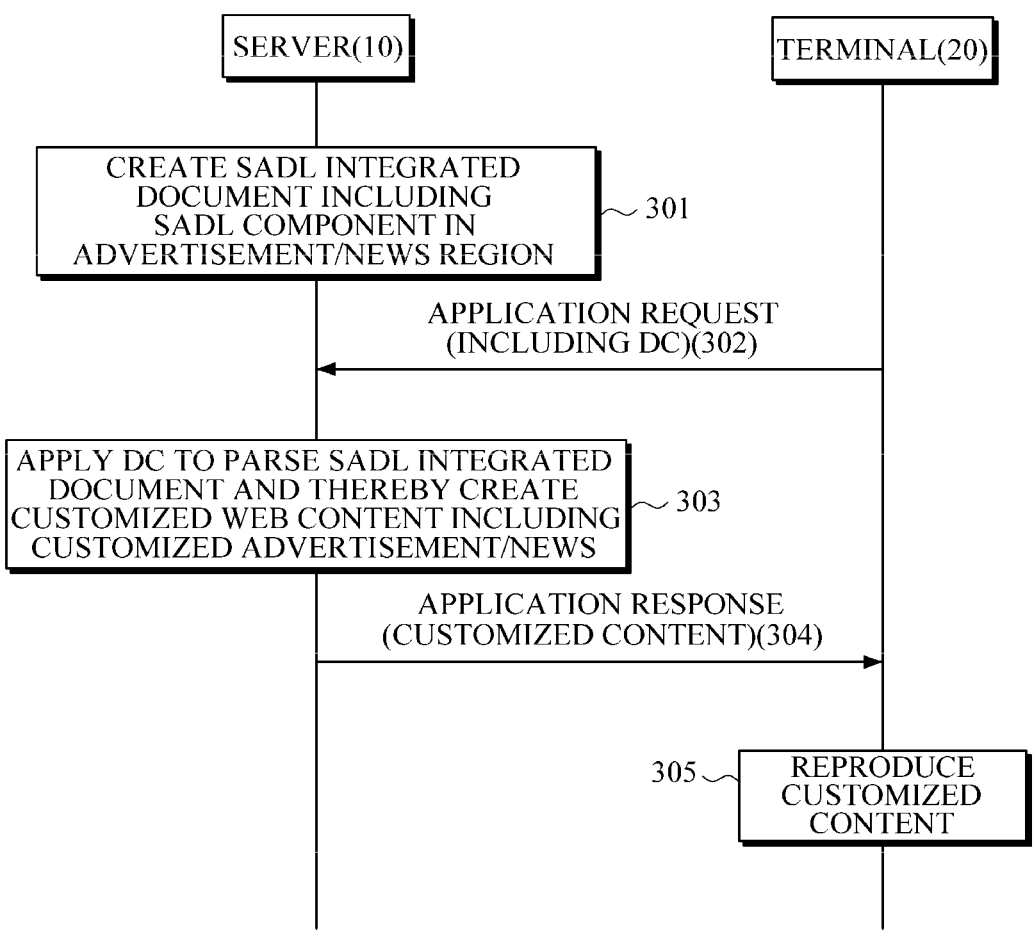
FIG. 4 is a flowchart illustrating an example of a method of providing customized advertisement/news in a scalable application service system.

FIG. 4 is a flowchart illustrating an example of a method of providing customized advertisement/news in a scalable application service system. In the example of FIG. 4, it is assumed that a server 10 communicates directly with a terminal 20, however, it is also possible that the server 10 may communicate with the terminal 20 through one or more repeaters 30 (see FIG. 1), as described above with reference to FIG. 1. Also, in the example of FIG. 4, the server 10 applies DC to SADL integrated document including a SADL component to parse the SADL integrated document to thereby transmit customized advertisement/news content to the terminal 20. However, the operation of applying DC to a SADL component of SADL integrated document to parse the SADL integrated document may be performed by at least one of the server 10, the terminal 20, and the repeater 30.

Referring to FIG. 4, the server 10 creates SADL integrated document including a SADL component in an advertisement/news region of existing content (301). The server 10 may create SADL integrated document using the authoring unit 100 (see FIG. 2) that is installed in the server 10 or in another apparatus. A method in which the server 10 creates SADL integrated document including a SADL component has been described above with reference to FIG. 2, and accordingly, a detailed description therefor will be omitted.

The SADL integrated document is, unlike existing web content that provides predetermined advertisement/news regardless of DC, SADL integrated content that enables advertisement/news differentiated according to DC to be included in an advertisement/news region and reproduced. For example, the SADL integrated document may be document describing web content that enables advertisement/news based on a predetermined resolution of images or moving images differentiated according to device capability information which is an example of DC, for example, according to a display size of a specific terminal to be included in the content, and/or a predetermined kind of advertisement/news differentiated according to a user's preferences, native place, age, etc., which is an example of user information, to be included in the content, and/or specific advertisement/news differentiated according to a user's rank which is an example of service policy information to be included in the content, and/or a predetermined size of advertisement/news differentiated according to a network state, an allocated bandwidth, or the remaining amount of terminal battery power, which are examples of environmental information, to be included in the content.

Then, the terminal 20 transfers an application request signal to the server 10 (302). The application request signal is created by the terminal 20 when a user performs predetermined input manipulation through a user interface in order to access a service server provided by the server 10, and then transmitted to the server 10. The application request signal may be subject to an arbitrary communication rule, method or protocol. The application request signal may include DC about the corresponding user and/or terminal 20. However, if DC has been already transmitted to the server 10, for example, if the terminal 20 has transmitted DC to the server 10 before transmitting the application request signal to the server 10 in operation 302 or if DC has already stored in the server 10, the application request signal may include no DC. In addition, according to an example, all or a part of DC may be not transmitted to the server 10 or all or a part of DC may be anonymously transmitted to the server 10. This is aiming at preventing information related to a user' privacy from being transmitted to the server 10 or at preventing information about the terminal 20 that has transmitted information to the server 10 from being exposed to the outside.

The server 20 that has received the application request signal applies the DC about the terminal 20 to the SADL integrated document (specifically, a SADL component of the SADL integrated document) to parse the SADL integrated document, thereby creating customized content including customized advertisement/news (303). The operation of applying DC to parse SADL integrated document may be performed by the parser 200 illustrated in FIG. 3. Details for a method in which the server 10 applies DC to SADL integrated document (specifically, a SADL component) to thereby create customized content have been described above with reference to FIG. 3, and accordingly, a detailed description therefor will be omitted.

The customized content is web content including advertisement/news optimized for the corresponding user and/or the terminal 20 in an advertisement/news region of existing content. For example, if a specific terminal has a large size of display, advertisement/news containing a large size (high-definition) of images or moving images may be included in the customized content, whereas if a specific terminal is a small size of display, advertisement/news containing a small size of images or moving images may be included in the customized content. Also, advertisement/news associated with the user's native place may be included in the customized content, or advertisement/news matching the user's preferences in consideration of the user's age, scholarship, occupation, etc. may be included in the customized content. In addition, if the user is a free-of-charge user, general advertisement/news having relatively low importance may be included in the customized content, whereas if the user is a charged user, advertisement/news belonging to advanced information may be included in the customized content. Furthermore, if a network state is good or the battery power of the terminal 20a is sufficient, advertisement/news such as moving images requiring a relatively large capacity may be included in the customized content, whereas if the network state is poor or the battery power of the terminal 20 is insufficient, advertisement/news, such as images or text, requiring a relatively small capacity may be included in the customized content.

Then, the server 10 transmits the created customized content to the terminal 20 (304). The customized content is transmitted from the server 10 to the terminal 20 in response to the application request. The terminal 20 that has received the customized content reproduces the customized content. As a result, the customized content including advertisement/news optimized according to DC is displayed on the display of the terminal 20.

Figure 5:
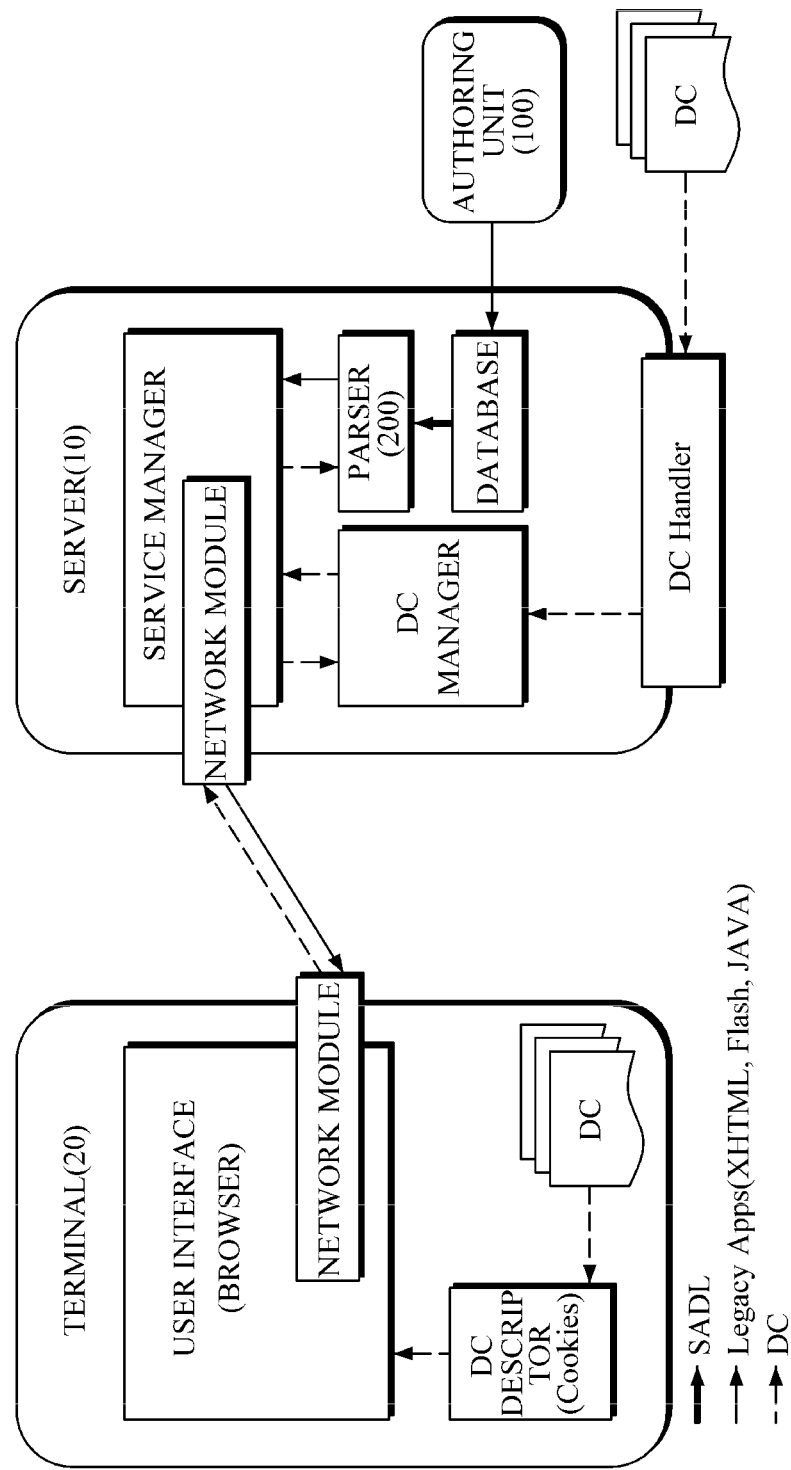
FIG. 5 is a diagram illustrating a configuration example of a scalable application service system that can provide a customized advertisement/news service.

FIG. 5 is a diagram illustrating a configuration example of a scalable application service system that can provide a customized advertisement/news service. Like FIG. 4, FIG. 5 relates to the case where a server 10 applies all of DC to SADL integrated document including a SADL component to parse the SADL integrated document and transmits content including customized advertisement/news to a terminal 20. Referring to FIG. 5, the terminal 20 includes a user interface, a network module, and a DC descriptor, and the server 10 includes a service manager, a network module, a DC manager, a DC handler, a parser 200, and a database. Also, the server 10 may further include an authoring tool 100.

The service manager of the server 10 receives DC from the terminal 2 through the network module. The DC may be received together with an application request signal from the terminal 20. However, all of DC stored in the terminal 20 does not need to be transferred at the same time to the server 10. The service manager may transfer the received DC to the DC manager, or extract desired DC from the DC manager and transfer it to the parser 200. Further, the service manager may analyze an application service request received from the terminal 20 to thus request desired DC to the DC manager, and transfer DC received from the DC manager to the parser 200. The parser 200 applies the DC to SADL integrated content to parse a SADL component (that is, a component containing advertisement/news content) of the SADL integrated content, thereby creating a customized advertisement/news application or content with a presentationable format. The service manager may transfer the customized advertisement/news application or content to the terminal 20. The service manager also may perform management for providing an application service.

The network modules installed respectively in the terminal 20 and server 10 are for communication between the terminal 20 and the server 10. The network module of the server 10 may be included in the service manager. Through the network modules, service requests from a user, DC related to filtering of a SADL component, applications or content including customized advertisement/news, etc. may be transferred between the terminal 20 and the server 10.

Since the parser 200 of the server 10 has been described above in detail with reference to FIG. 3, and accordingly, the parser 200 will be described briefly below. The parser 200 receives SADL integrated document, specifically, DC of the terminal 20 and resource identification information from the service manager, wherein the DC of the terminal 20 is filtering information required for a SADL component of SADL integrated document and the resource identification information is information (for example, a Uniform Resource Identifier (URI)) about content requested from the terminal 20. Then, the parser 200 brings the corresponding SADL integrated content stored in the database to filter the SADL integrated content using the received DC. Then, the parser 200 transfers the filtered content including customized advertisement/news to the service manager.

The database is used to store SADL integrated document created by the authoring unit 100, and corresponds to a SADL application repository. The SADL integrated content stored in the database is filtered by the parser 200 using DC received from the terminal 20 according to a request from a user, and then is serviced to the user.

The DC handler of the server 10 functions to collect DC. DC that is collected by the DC handler may be user information provided from another server, service policy information related to a policy about use of the corresponding content, information related to charging, etc. The DC handler may be a module included in the server 10 or an independent module separated from the server 10.

The DC manager manages DC received from the terminal 20 and DC collected through the DC handler. When receiving a service request from a user, the DC manager may provide DC about the corresponding user, being managed by itself, to the service manager or directly to the parser 200.

The DC descriptor of the terminal 20 is used to describe DC that can be collected by the terminal 20. DC that can be collected by the terminal 20 may be information related to device capability, user information such as user preferences, etc. In the current example, a format in which DC is described is not limited. For example, DC may be described in the format of Cookie. In this case, Cookie is stored in the terminal 20 and thereafter transmitted to the server 10 when a service request is issued. Here, since DC included in the Cookie is not stored in the server 10, it can be considered that DC is anonymously transmitted. Accordingly, transmitting DC in the format of Cookie is a method for protecting user's privacy.

The user interface of the terminal 20 transmits a DC descriptor and information about desired content to the server 10 through the network module. The server 10 uses the information about the desired content to extract the corresponding scalable application from the database, and then performs filtering using DC received from the terminal 20 and DC collected by the DC manager of the server 10. After filtering, the scalable application is configured in the format of legacy content that has been previously serviced, and then transmitted to the terminal 20. Finally, the terminal 20 may receive the content requested by the user through the user interface. In the current example, since the terminal 20 includes no parser, content transmitted from the server 10 has a format that can be reproduced in a general web browser.

Figure 6:
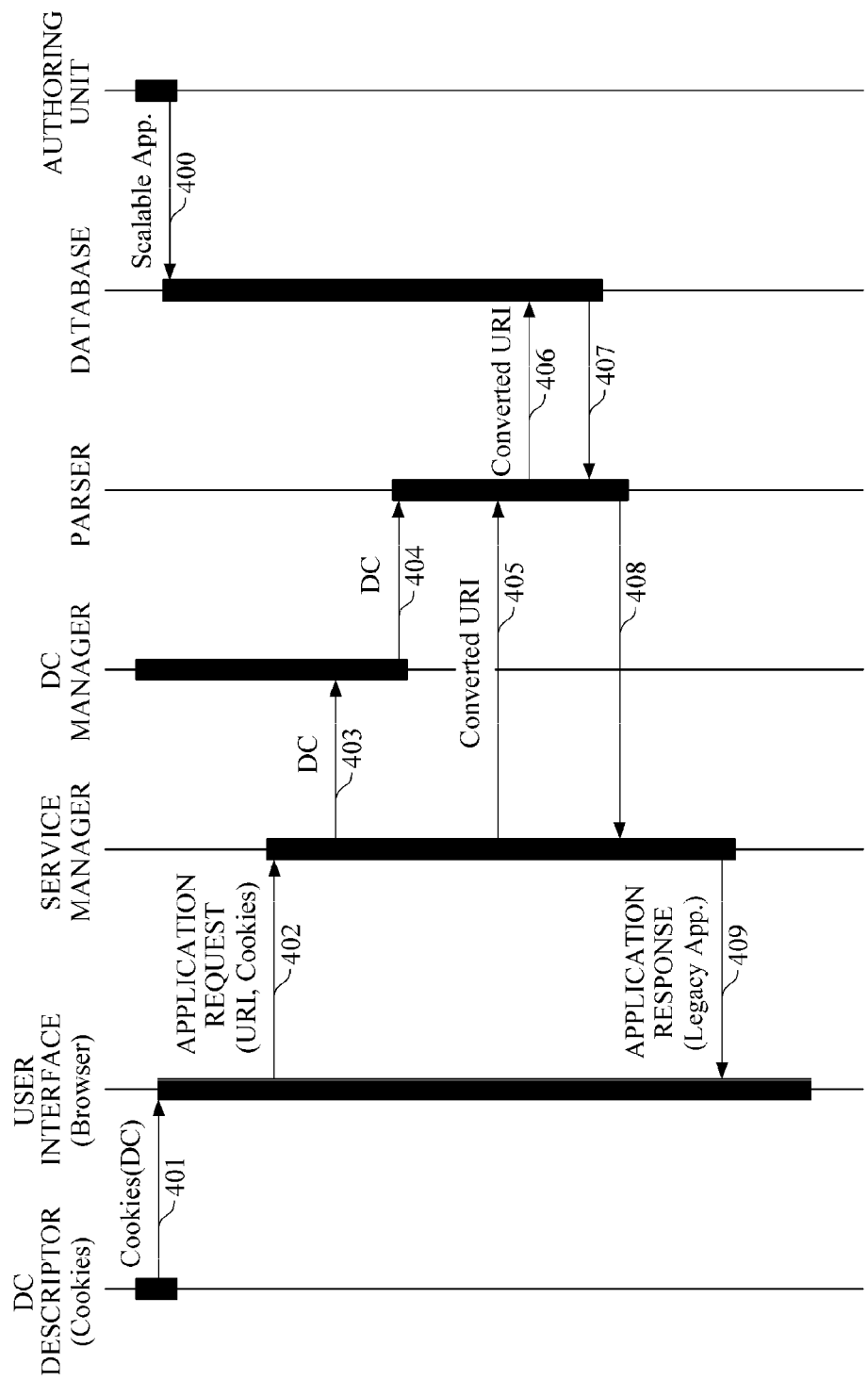
FIG. 6 is a flowchart illustrating an example of a customized advertisement/news providing method that is performed in the scalable application service system illustrated in FIG. 5.

FIG. 6 is a flowchart illustrating an example of a customized advertisement/news providing method that is performed in the scalable application service system illustrated in FIG. 5.

Referring to FIG. 6, a service provider creates SADL integrated content including a SALD component or a scalable application using an authoring tool, and transfers the SADL integrated content to a database (400). The SADL integrated content may be described as SADL integrated document. SADL integrated document is created by substituting a component (specifically, a component related to advertisement/news) of existing content document with a SADL component.

The operation 400 of creating SADL integrated content may be performed before a service starts, and the service provider initiates the corresponding service after creating the SADL integrated content.

Then, the DC descriptor of a terminal collects DC that is to be transmitted to the server, and the collected DC is transferred to a network module of a user interface through Cookie that can be anonymously transmitted (401) Then, the user interface of the terminal transfers an application request including Cookie and a URI of desired content, to the server, wherein the Cookie contains DC (402). Then, the service manager of the server transfers the DC received from the terminal to the DC manager (403), converts the URI of the desired content into a URI of a scalable application including a SADL component, and transfers the converted URI to the parser (405). The DC about the terminal, transferred to the DC manager, is transferred to the parser (404). At this time, the DC manager may transfer DC about the terminal, collected by the DC handler, to the parser.

The parser transfers the converted URI received from the service manager to the database to thereby request SADL integrated content stored in the database (406). The database transfers the SADL integrated content to the parser according to the request (407). Then, the parser performs parsing (filtering) on the SADL integrated content using the DC received in operation 404. Then, the parser transfers a legacy application in a presentationable format as the result of the filtering to the service manager (408). Successively, the service manager transfers the legacy application to the user interface of the terminal (409), and the user interface services the legacy application to the user through a browser.

Figure 7:
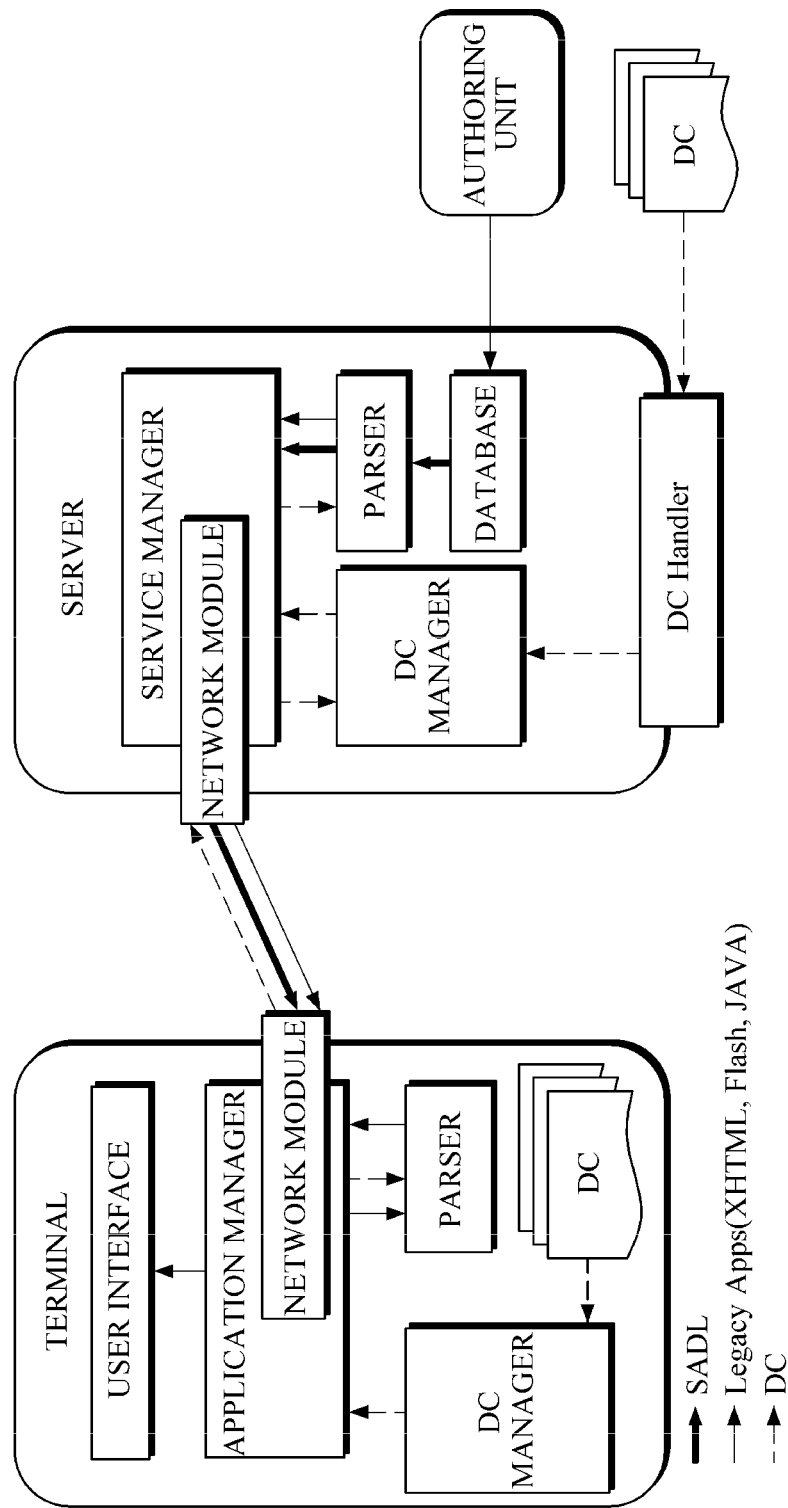
FIG. 7 is a diagram illustrating another configuration example of a scalable application service system that can provide a customized advertisement/new service.

FIG. 7 is a diagram illustrating another configuration example of a scalable application service system that can provide a customized advertisement/new service. The scalable application service system of FIG. 7 is different from the service system illustrated in FIG. 5 in that both a server and a terminal include parsers respectively. According to the current example, since the terminal includes the parser, the terminal may provide a part of DC to the server 10 in order to receive a scalable service. In more detail, a user does not need to provide the server with user information (DC) which he or she does not want to provide to the server. In this case, the terminal may receive SADL integrated content that has not completely been filtered from the server, and apply DC that has not been transmitted to the server, to the received SADL integrated content to thereby filter the SADL integrated content. In addition, the terminal may perform filtering by applying DC changing in real time, for example, a viewing state to the received SADL integrated content in real time. Referring to FIG. 7, the terminal includes a user interface, an application manager, a network module, a DC descriptor, and a parser, and the server includes a service manager, a network module, a DC manager, a DC handler, a parser, and a database. Also, the server may further include an authoring tool.

The service manager of the server receives DC from the terminal 20 through the network module. The DC may be received from the terminal 20 together with an application request signal from the terminal 20. All of DC about the terminal 20 does not need to be transmitted at the same time to the server 10. For example, user information related of the user's privacy, viewing state information changing in real time, etc. may not be transferred to the server 10. The service manager may transfer the received DC to the DC manager, or may extract a desired part from the received DC and transfer the extracted part to the parser. Also, the service manager may analyze an application service request received from the terminal so as to request the DC manager to send needed DC, and transfer DC received from the DC manager to the parser.

The parser applies the received DC to the SADL integrated content to parse a SADL component (that is, a component including advertisement/news) of the SADL integrated content, thereby creating new SADL content. The service manager may transfer the new SADL content to the terminal. The service manager may perform management for providing an application service.

The network modules installed respectively in the terminal and server are for communication between the terminal and server. The network module of the server may be included in the service manager. Through the network modules, service requests from the user, DC related to filtering of a SADL component, SADL content for customized advertisement/news, etc. may be transmitted between the terminal and the server.

The parser of the server has been described above in detail with reference to FIG. 3, and accordingly, the parser will be described briefly below. The parser of the server receives SADL integrated document from the service manager. In more detail, the parser receives, from the service manager, DC about the terminal, which is filtering information required for a SADL component of SADL integrated document, and resource identification information (for example, a URI) of content requested from the terminal. Then, the parser brings the corresponding SADL integrated content stored in a database and filters the SADL integrated content using the received DC. Thereafter, the parser transfers the filtered SADL content or content including customized advertisement\news to the service manager.

The database is used to store SADL integrated document created by the authoring unit 100, and corresponds to a SADL application repository. The SADL integrated content stored in the database is filtered by the parser using DC received from the terminal according to a request from a user, and then serviced to the user.

The DC handler of the server functions to collect DC. DC collected by the DC handler may be user information provided from another server, service policy information related to a policy about use of the corresponding content, information related to charging, etc. The DC handler may be a module included in the server or an independent module separated from the server.

The DC manager of the server manages DC received from the terminal and DC collected by the DC handler. The DC manager may provide, when receiving a service request from the user, DC being managed by itself to the service manager or directly to the parser.

The DC manager of the terminal stores DC, such as device capability, user information, viewing state informant, etc., which has been collected by the terminal. A part of the DC stored in the DC manager is transmitted to the server, and the remaining part of the DC may be used in filtering by the parser of the terminal. That is, the parser of the terminal 20 may apply DC received from the DC manager to the partially filtered SADL content received from the server to thereby filter the SADL content in a presentationable format.

The DC descriptor of the terminal 20 is used to describe DC that can be collected by the terminal. DC that can be collected by the terminal may be information related to device capability, user information such as user preferences, etc. In the current example, a format in which DC is described is not limited. For example, DC may be described in the format of Cookie. In this case, Cookie is stored in the terminal and thereafter transmitted to the server when a service request is issued. Here, since DC included in the Cookie is not stored in the server, it can be considered that DC is anonymously transmitted. Accordingly, transmitting DC in the format of Cookie is a method for protecting user's privacy.

The user interface of the terminal transmits a DC descriptor and information about desired content to the server through the network module. The server uses the information about the desired content to extract the corresponding scalable application from the database, and then performs filtering using DC received from the terminal and DC collected by the DC manager of the server. After filtering, the scalable application is configured in the format of legacy content that has been previously serviced, and then transmitted to the terminal. Finally, the terminal may receive the content requested by the user through the user interface. In the current example, since the terminal includes no parser, content transmitted from the server 10 has a format that can be reproduced in a general web browser.

Figure 8:
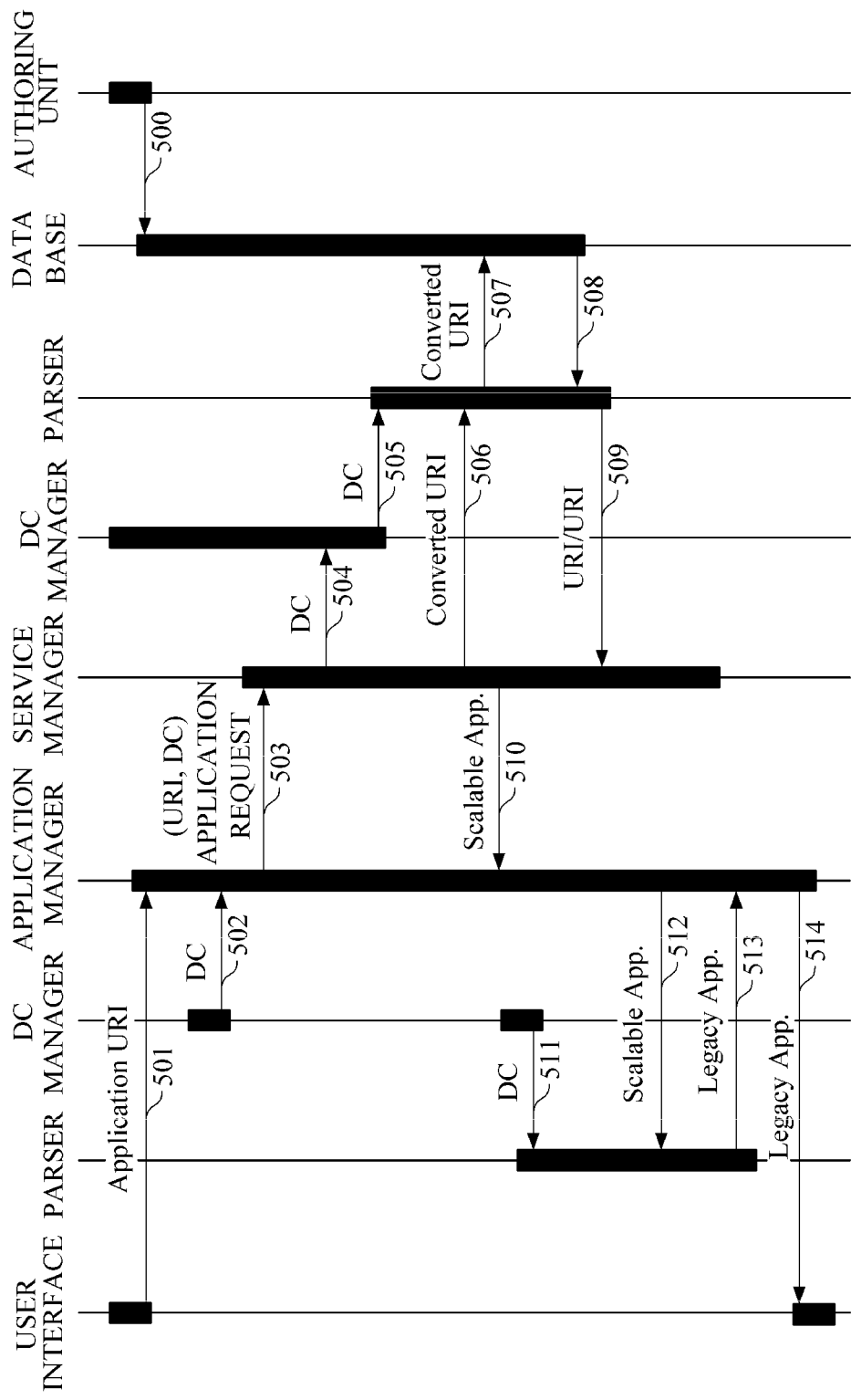
FIG. 8 is a flowchart illustrating an example of a customized advertisement/news providing method that is performed in the scalable application service system illustrated in FIG. 7.

FIG. 8 is a flowchart illustrating an example of a customized advertisement/news providing method that is performed in the scalable application service system illustrated in FIG. 7.

Referring to FIG. 8, a service provider creates SADL integrated content including a SADL component and a scalable application using an authoring tool, and transfer the SADL integrated content to a database (500). The SADL integrated content may be described as SADL integrated document. The SADL integrated document is created by substituting a component (specifically, a component related to advertisement/news) of existing content document with a SADL component. The operation 500 of creating SADL integrated content may be performed before a service starts, and the service provider initiates the corresponding service after creating SADL integrated content that is to be serviced.

A use interface of a terminal transfers an application URI received from a user to an application manager of the terminal (510). A DC descriptor of the terminal collects DC that is to be transmitted to the server and transfers the collected DC to the application manager (502). According to an example, the DC may be anonymously transmitted to the server. Also, the application manager of the terminal transmits an application request including DC and an application URI to the server (502). The service manager of the server transfers the DC received from the terminal to the DC manager (504), converts the application URI into a URI of a scalable application including a SADL component, and transfers the URI of the scalable application to the parser (506). The DC about the terminal transferred to the DC manager is transferred to the parser (505). At this time, DC about the terminal collected through the DC handler may be also transferred to the parser.

The parser transfers the converted URI received from the service manager to a database, and requests the database of SADL integrated content stored therein (507). The database transfers the SADL integrated content stored therein to the parser in response to the request (508). Then, the parser performs parsing (filtering) on the SADL integrated content using the DC received in operation 505. Then, the parser transfers the partially filtered SADL content to the service manager (509).

Successively, the service manager of the server transmits the partially filtered SADL content to the application manager of the terminal (510), and the service manager of the terminal transfers the received SADL content to the parser (512). At this time, the DC manager of the terminal may transfer DC that has not been transferred to the server to the parser in advance (511). The parser applies the DC received in operation 511 to the SADL content received from the application manager to perform filtering, and transfers customized content (legacy content) created by the filtering to the application manager (513). The application manager transfers the received legacy content to the user interface (514), and the user interface services the legacy application received from the application manager to a user through a browser.

According to the customized advertisement/news providing method as described above, a scalable application service including customized advertisement/news may be provided by adaptively changing only a part of existing content according to various user viewing state information while maintaining the format of existing content (for example, a web page) as it is. Accordingly, a user does neither need to input his or her own DC through a computer nor to execute setting for selecting his or her preferred advertisement/news, and also, no resetting is required even when Cookies, etc. is deleted. Furthermore, a service provider can provide a user with a web page including customized advertisement/news while maintaining the format of an existing web page as it is so that the service user does not need to create and store all web pages corresponding to various user viewing states.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of providing customized advertisement/news by a scalable application service server, comprising:
    substituting an advertisement/news component of existing content with a Scalable Application Description Language (SADL) component to create a SADL integrated document;
    receiving an application request requesting transmission of the existing content, the application request including delivery context about a terminal and a Uniform Resource Identifier (URI);
    converting the received URI into a converted URI associated with the SADL integrated document;
    applying the delivery context about the terminal to parse the SADL integrated document, thereby creating customized content including customized advertisement/news by
        requesting SADL integrated content using the converted URI,
        transferring the SADL integrated content from a database according to the request, and
        using the transferred SADL integrated content in the customized content; and
    transmitting an application response including the customized content to the terminal.

2. The method of claim 1, wherein the delivery context about the terminal is included in Cookies and then anonymously received.

3. The method of claim 1, wherein the applying of the delivery context about the terminal comprises applying delivery context collected by the scalable application service server together with the delivery context about the terminal received from the terminal.

4. The method of claim 1, wherein a part of the delivery context about the terminal is anonymously included in the application request, and
    the scalable application service server applies the delivery context about the terminal, which is anonymously received, to create partially parsed SADL integrated document and transmit the partially parsed SADL integrated document to the terminal.

5. The method of claim 1, wherein the database is stored at the scalable application service server, and wherein the converted URI is used to request SADL integrated content stored in the database at the application service server.

* * * * *